(12) United States Patent
Khashman et al.

(10) Patent No.: US 12,443,576 B2
(45) Date of Patent: *Oct. 14, 2025

(54) SYSTEMS AND METHODS FOR AUTOMATED AND ASSISTIVE RESOLUTION OF UNMAPPED PATIENT INTAKE DATA

(71) Applicant: Technology Partners LLC, Charlotte, NC (US)

(72) Inventors: Sam Faris Khashman, Charlotte, NC (US); Robert Edward Gontarek, Plano, TX (US)

(73) Assignee: Technology Partners LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,943

(22) Filed: Jan. 29, 2025

(65) Prior Publication Data

US 2025/0173316 A1 May 29, 2025

Related U.S. Application Data

(63) Continuation of application No. 18/901,250, filed on Sep. 30, 2024, now Pat. No. 12,242,445.

(60) Provisional application No. 63/541,067, filed on Sep. 28, 2023.

(51) Int. Cl.
*G06F 16/215* (2019.01)
*G06F 3/04847* (2022.01)

(52) U.S. Cl.
CPC ........ *G06F 16/215* (2019.01); *G06F 3/04847* (2013.01)

(58) Field of Classification Search
CPC ........................... G06F 16/215; G06F 3/04847
See application file for complete search history.

(56) References Cited

U.S. PATENT DOCUMENTS

| | | | |
|---|---|---|---|
| 10,776,583 B2 * | 9/2020 | Guo | G06F 40/18 |
| 2014/0350954 A1 | 11/2014 | Ellis et al. | |
| 2018/0060381 A1 | 3/2018 | Cook et al. | |
| 2020/0278836 A1 | 9/2020 | Mueller et al. | |
| 2023/0195715 A1 * | 6/2023 | Schleith | G06F 16/285 707/691 |
| 2024/0289346 A1 * | 8/2024 | Grimes | G06F 16/215 |

* cited by examiner

*Primary Examiner* — Maher N Algibhah
(74) *Attorney, Agent, or Firm* — Padowithz Alce; Quintin Scheitlin; Alce PLLC

(57) ABSTRACT

A computer-implemented method for automated data record resolution includes: receiving an unmapped data record comprising a plurality of data fields, wherein at least one data field of the plurality of data fields causes a mapping error between the unmapped data record and a plurality of validated data records; generating, from the plurality of validated records, a resolution candidate record for the unmapped data record based on detecting the mapping error between the unmapped data record and the plurality of validated data records; and automatically re-assigning one or more data records of the computer database that are digitally associated with the unmapped data record to the resolution candidate record.

12 Claims, 7 Drawing Sheets

200

Obtaining Patient Intake Data S210

Computing Entity Resolution Inferences S220

Resolving Unmapped Patient Intake Data S230

Accelerating Post-Intake Medical Activities S240

Insurance Plan

Unmapped Records

Location: Demo Location 10
Records: ● All ○ Smartlist ○ Manual

| Plan Name | Address 01 | Address 02 | City | State | Zip |
|---|---|---|---|---|---|
| Amerigroup Star Plus MMP | P.O. Box 61010 | | Virginia Beach | VA | 23466 |
| Amerigroup UHRIP Star+ | PO Box 62047 | | Virginia Beach | VA | 23466 |
| BCBS PPO | PO Box 660044 | | Dallas | TX | 75266 |
| BCBS PPO | PO Box 660044 | | Dallas | TX | 75266 |
| BCBS PPO | P.O Box 660044 | | Dallas | TX | 75266 |
| BCBSt TRS Activecare HMO | PO Box 660044 | | Dallas | TX | 75266 |
| BCBS TRS Activecare PPO | PO Box 660044 | | Dallas | TX | 75266 |
| Blue Cross Of TX MCR PPO | P.O. Box 3686 | | Scranton | TX | 18505 |
| Central States Health | 1212 N 96 St | | Omaha | TX | 68114 |
| ChristusHLTH Plan | PO Box 981651 | | El Paso | TX | 79998 |
| Cigna Behavioral Health Of TX | PO Box 188004 | | Chattanooga | TX | 37422 |
| Cigna HIX | PO Box 182223 | | Chattanooga | TX | 37422 |
| Cigna HMO | PO Box 182223 | | Chattanooga | TX | 37422 |
| Cigna Medicare Supplement | PO Box 30010 | | Austin | TX | 78755 |
| Cigna Medicare Supplement Ins | PO Box 30010 | | Austin | TX | 78755 |
| Cigna PPO | PO Box 188061 | | Chattanooga | TX | 37422 |
| Cigna PPO | PO Box 182223 | | Chattanooga | TX | 37422 |
| Cigna PPO | PO Box 182223 | | Chattanooga | TX | 37422 |
| Community HLT UHRIP Star | PO Box 301404 | | Houston | TX | 77230 |
| Community HLT UHRIP Star+ | PO Box 301404 | | Houston | TX | 77230 |

Record Per Page: 20    « ‹ 1 2 3 4 5 6 › »

Existing Records

Lowest 30%  Possible Matches +/-  Highest 90%

| Confidence Score | Plan Name | Address 01 | Address 02 | City | State | Zip |
|---|---|---|---|---|---|---|
| 88% | Amerigroup Medicaid | P.O. Box 61010 | | Virginia Beach | VA | 23466 |
| 87% | Amerigroup Medicare | PO Box 61010 | | Virginia Beach | VA | 23466 |

FIGURE 6

SYSTEMS AND METHODS FOR AUTOMATED AND ASSISTIVE RESOLUTION OF UNMAPPED PATIENT INTAKE DATA

CROSS-REFERENCE TO RELATED APPLICATIONS

This application is a continuation of U.S. patent application Ser. No. 18/901,250, filed on 30 Sep. 2024, which claims the benefit of U.S. Provisional Application No. 63/541,067, filed 28 Sep. 2023; each of which is incorporated herein by reference in its entirety for all purposes.

TECHNICAL FIELD

This invention relates generally to the computer-based learning field and, more specifically, to a new and useful system and method that utilizes machine learning algorithms to expedite the resolution of unmapped entities in patient intake data.

BACKGROUND

Healthcare providers collect a variety of information during an intake of a patient. This information, commonly referred to as "patient intake data," is often of low quality due to various reasons. For instance, manual data entry errors, miscommunication between healthcare professionals and patients, discrepancies in data collection practices among different medical entities, and/or the like can all contribute to the degradation of the patient intake data.

Due to the "noisy" nature of the patient intake data, systems or services that rely on such data may experience unintended operating behavior if left uncorrected. Fixing errors or inconsistencies in the patient intake data often require a human expert to manually review and correct such errors or inconsistencies. This manual process is not only error-prone, time-intensive, and expensive, but also fails to scale in scenarios where the patient intake data includes hundreds (or thousands) of errors or inconsistencies.

Accordingly, there is a need for new and useful systems and methods that assistively or automatically resolve errors or inconsistencies in the patient intake data. The embodiments of the present application provide technical solutions that at least address the needs described above, as well as the deficiencies of the state of the art.

BRIEF SUMMARY OF THE INVENTION(S)

In some embodiments, a computer-implemented method for automated data record resolution includes: at a remote record resolution service being executed by one or more computer servers: receiving an unmapped data record comprising a plurality of data fields, wherein at least one data field of the plurality of data fields causes a mapping error between the unmapped data record and a plurality of validated data records; generating, from the plurality of validated records, a resolution candidate record for the unmapped data record based on detecting the mapping error between the unmapped data record and the plurality of validated data records, wherein generating the resolution candidate record includes: computing, via a record correlator machine learning model, a plurality of record correlation inferences between the unmapped data record and each of the plurality of validated data records, identifying a record correlation inference of the plurality of record correlation inferences outputted by the record correlator machine learning model that has a confidence score greater than a pre-defined maximum confidence threshold, querying a computer database for a validated data record of the plurality of validated data records that is associated with the record correlation inference that has the confidence score greater than the pre-defined maximum confidence threshold, and in response to the querying, setting the validated data record associated with the record correlation inference as the resolution candidate record for the unmapped data record; and automatically re-assigning one or more data records of the computer database that are digitally associated with the unmapped data record to the resolution candidate record based on the setting of the validated data record, wherein the automatic reassignment of the one or more data records includes updating metadata associated with the one or more data records to include one or more metadata values for creating a digital record association within the computer database between the one or more data records and the resolution candidate record.

In some embodiments, the plurality of data fields of the unmapped data record at least includes a first data field and a second data field, and generating the resolution candidate record includes: detecting if the at least one data field causing the mapping error between the unmapped data record and the plurality of validated data records includes the first data field or the second data field, electing the record correlator machine learning model based on the detecting, wherein electing the record correlator machine learning model includes: electing a first record correlator machine learning model from a record correlator machine learning model database when the at least one data field includes the first data field, and electing a second, different from the first, record correlator machine learning model from the record correlator machine learning model database when the at least one data field includes the second data field.

In some embodiments, the computer-implemented method further comprises: configuring a plurality of record correlator machine learning models of the record correlator machine learning model database via a graphical user interface of the remote record resolution service, and the graphical user interface of the remote record resolution service includes: a user interface table component, and a plurality of rows within the user interface table component that correspond to the plurality of record correlator machine learning models, wherein a row of the user interface table corresponding to a respective record correlator machine learning model of the plurality of record correlator machine learning models includes: text indicating a name of the respective record correlator machine learning model, an enable toggle button for activating or deactivating the respective record correlator machine learning model in the remote record resolution service, a plurality of user interface input fields for specifying an execution frequency of the respective record correlator machine learning model, a user interface input field for setting a start time to begin executing the respective record correlator machine learning model, a plurality of user interface input fields for specifying a span of time to avoid the executing of the respective record correlator machine learning model, an adjustable slider user interface component for defining a threshold range that requires a user to confirm the resolution candidate record resolves the unmapped data record when an inference associated with resolution candidate record falls within the threshold range, and a user interface text field that visually indicates that the remote record resolution service automatically resolves the unmapped data record to the resolution candidate record when the inference associated with the resolution candidate record exceeds the pre-defined maximum confidence threshold.

In some embodiments, the at least one data field that causes the mapping error between the unmapped data record and the plurality of validated data records includes a first respective data field and a second respective data field, the generating generates the resolution candidate record for the first respective data field of the unmapped data record and a second resolution candidate record for the second respective data field, and generating the resolution candidate record for the first respective data field and the resolution candidate record for the second respective data field includes: computing, via the record correlator machine learning model corresponding to the first respective data field, the plurality of record correlation inferences between the unmapped data record and each of the plurality of validated data records, computing, via a second record correlator machine learning model corresponding to the second respective data field, a plurality of second record correlation inferences between the unmapped data record and each of the plurality of validated data records, identifying the record correlation inference of the plurality of record correlation inferences and a second record correlation inference of the second plurality of record correlation inferences that has the confidence score greater than the pre-defined maximum confidence threshold, querying the computer database for the validated data record of the plurality of validated data records that is associated with the record correlation inference and a second validated data record of the plurality of validated data records that is associated with the second record correlation inference, and in response to the querying: setting the validated data record associated with the record correlation inference as the resolution candidate record for the first respective data field of the unmapped data record, and setting the second validated data record associated with the second record correlation inference as the resolution candidate record for the second respective data field of the unmapped data record.

In some embodiments, the automatically re-assigning re-assigns the one or more data records of the computer database that are digitally associated with the first respective data field and the second respective data field of the unmapped data record to being digitally associated with the validated data records and the second validated data record, and the automatic reassignment of the one or more data records includes updating the metadata associated with the one or more data records to include one or more metadata values associated with one or more attributes of the resolution candidate record for the first respective data field for creating the digital record association within the computer database between the one or more data records and the resolution candidate record for the first respective data field, and updating the metadata associated with the one or more data records to include one or more metadata values associated with one or more attributes of the second resolution candidate record for the second respective data field for creating the digital record association within the computer database between the one or more data records and the resolution candidate record for the second respective data field.

In some embodiments, the identifying identifies the record correlation inference that (1) has the confidence score greater than the pre-defined maximum confidence threshold or (2) has the confidence score between a pre-defined minimum confidence threshold and the maximum confidence threshold, the querying queries the computer database for the validated data record that is associated with the record correlation inference that (1) has the confidence score greater than the pre-defined maximum confidence threshold or (2) has the confidence score between a pre-defined minimum confidence threshold and the maximum confidence threshold, and the generating the resolution candidate record further includes: in accordance with a determination that the confidence score of the record correlation inference is greater than the pre-defined maximum confidence threshold: setting the validated data record associated with the record correlation inference as the resolution candidate record for the unmapped data record, and in accordance with a determination that the confidence score of the record correlation inference is between the pre-defined minimum confidence threshold and the maximum confidence threshold: adding the unmapped data record to a record mapping error queue that displays the unmapped data record in association with the validated data record that corresponds to the record correlation inference that is between the pre-defined minimum confidence threshold and the maximum confidence threshold.

In some embodiments, the record mapping error queue includes: an unmapped records table that is configured to display a plurality of unmapped data record entries corresponding to a plurality of unmapped data records, and a validated records table that is configured to display a plurality of validated data record entries that likely resolves a respective unmapped data record entry currently selected in the unmapped records table.

In some embodiments, the respective unmapped data record entry currently selected in the unmapped records table corresponds to the unmapped data record, the plurality of validated data record entries that likely resolves the respective unmapped data record entry corresponds to: the validated data record that corresponds to the record correlation inference that is between the pre-defined minimum confidence threshold and the maximum confidence threshold, and a plurality of additional validated data records that correspond to a plurality of additional record correlation inferences that were computed by the record correlator machine learning model and are between the pre-defined minimum confidence threshold and the maximum confidence threshold.

In some embodiments, the record mapping error queue further includes a range slider user interface component for controlling a confidence score threshold range. In some embodiments, the computer-implemented method further comprises: receiving an input changing the confidence score threshold range from being between the pre-defined minimum confidence threshold and the maximum confidence threshold to being between a second pre-defined minimum confidence threshold and a second pre-defined maximum confidence threshold, and in response to receiving the input: identifying that the confidence score of the record correlation inference associated with the validated data record is not between the second pre-defined minimum confidence threshold and the second pre-defined maximum confidence threshold, forgoing display, in the validated records table, a validated data record entry of the plurality of validated data record entries that corresponds to the validated data record, and maintaining display, in the validated records table, the plurality of validated data record entries that correspond to the plurality of additional validated data records.

In some embodiments, the unmapped records table includes a plurality of columns with labels identifying the plurality of data fields, the validated records table includes a confidence score column and a plurality of columns with labels identifying data fields associated with the plurality of validated data records, the respective unmapped data record entry corresponding to the unmapped data record includes values of the plurality of data fields of the respective unmapped data record stored across the plurality of columns of the unmapped records table, and the validated data record entry corresponding to the validated data record includes (1) the confidence score of the record correlation inference associated with the validated data record and (2) values of the data fields of the validated data record across the plurality of columns of the validated records table.

In some embodiments, the record mapping error queue includes: a first selectable button that, when selected, causes the respective unmapped data record entry to resolve the unmapped data record to the validated data record and the remote record resolution service to resolve future instances of the unmapped data record to the validated data record, a second selectable button that, when selected, causes the respective unmapped data record entry to resolve the unmapped data record to the validated data record and without resolving the future instances of the unmapped data record to the validated data record, a third selectable button that, when selected, causes the respective unmapped data record entry to be added to the computer database, and a fourth selectable button that, when selected, blocks the remote record resolution service from resolving the unmapped data record and the future instances of the unmapped data record to the validated data record.

In some embodiments, identifying the record correlation inference that has the confidence score greater than the pre-defined maximum confidence threshold includes: identifying a first respective record correlation inference of the plurality of record correlation inferences, and using the first respective record correlation inference as the record correlation inference if a confidence score of the first respective record correlation inference is greater than confidence scores associated with a remainder of the plurality of record correlation inferences.

In some embodiments, a value of the confidence score of the first respective record correlation inference is bounded between zero percent (0%) and one hundred percent (100%).

In some embodiments, generating the resolution candidate record includes computing, via a record vectorization model, a vector representation of the unmapped data record based on an input of the plurality of data fields of the unmapped data record, and the computing, via the record correlator machine learning model, computes the plurality of record correlation inferences between the vector representation of the unmapped data record and a vector representation of each of the plurality of validated data records.

In some embodiments, the unmapped data record corresponds to an unmapped health level seven (HL7) data record, and the plurality of data fields of the unmapped data record correspond to one or more data fields within the unmapped health level seven data record.

In some embodiments, the plurality of validated data records include a plurality of data fields, and the mapping error between the unmapped data record and the plurality of validated data records is detected when the at least one data field of the plurality of data fields is not equivalent to a respective data field of the plurality of data fields of the plurality of validated data records.

In some embodiments, the at least one data field of the unmapped data record and the respective data field of a respective validated data record are determined to be equivalent if a value of the at least one data field of the unmapped data record and a value of the respective data field of the respective validated data record result in a literal text match, and the at least one data field of the unmapped data record and the respective data field of a respective validated data record are determined to not be equivalent if the value of the at least one data field of the unmapped data record and the value of the respective data field of the respective validated data record do not result in the literal text match.

In some embodiments, the receiving further receives a plurality of additional unmapped data records, the generating further generates a plurality of additional resolution candidates for the plurality of additional unmapped data records, and the automatically re-assigning further automatically re-assigns one or more data records of the computer database from being associated with the plurality of additional unmapped data records to being associated with the plurality of additional resolution candidates.

In some embodiments, a computer-program product comprising a non-transitory machine-readable storage medium storing computer instructions that, when executed by one or more processors, perform operations comprising: at a remote record resolution service being executed by one or more computer servers: receiving an unmapped data record comprising a plurality of data fields, wherein at least one data field of the plurality of data fields causes a mapping error between the unmapped data record and a plurality of validated data records; generating, from the plurality of validated records, a resolution candidate record for the unmapped data record based on detecting the mapping error between the unmapped data record and the plurality of validated data records, wherein generating the resolution candidate record includes: computing, via a record correlator machine learning model, a plurality of record correlation inferences between the unmapped data record and each of the plurality of validated data records, identifying a record correlation inference of the plurality of record correlation inferences outputted by the record correlator machine learning model that has a confidence score greater than a pre-defined maximum confidence threshold, querying a computer database for a validated data record of the plurality of validated data records that is associated with the record correlation inference that has the confidence score greater than the pre-defined maximum confidence threshold, and in response to the querying, setting the validated data record associated with the record correlation inference as the resolution candidate record for the unmapped data record; and automatically re-assigning one or more data records of the computer database that are digitally associated with the unmapped data record to the resolution candidate record based on the setting of the validated data record, wherein the automatic reassignment of the one or more data records includes updating metadata associated with the one or more data records to include one or more metadata values for creating a digital record association within the computer database between the one or more data records and the resolution candidate record.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: at a remote record resolution service being executed by one or more computer servers: receiving an unmapped data record comprising a plurality of data fields, wherein at least one data field of the plurality of data fields causes a mapping error between the unmapped data record and a plurality of validated data records; generating, from the plurality of validated records, a resolution candidate record for the unmapped data record based on detecting the mapping error between the unmapped data record and the plurality of validated data records, wherein generating the resolution candidate record includes: computing, via a record correlator machine learning model, a plurality of record correlation inferences between the unmapped data record and each of the plurality of validated data records, identifying a record correlation inference of the plurality of record correlation inferences outputted by the record correlator machine learning model that has a confidence score greater than a pre-defined maximum confidence threshold, querying a computer database for a validated data record of the plurality of validated data records that is associated with the record correlation inference that has the confidence score greater than the pre-defined maximum confidence threshold, and in response to the querying, setting the validated data record associated with the record correlation inference as the resolution candidate record for the unmapped data record; and automatically re-assigning one or more data records of the computer database that are digitally associated with the unmapped data record to the resolution candidate record based on the setting of the validated data record, wherein the automatic reassignment of the one or more data records includes updating metadata associated with the one or more data records to include one or more metadata values for creating a digital record association within the computer database between the one or more data records and the resolution candidate record.

BRIEF DESCRIPTION OF THE FIGURES

FIG. 2 illustrates an example method 200 in accordance with one or more embodiments of the present application;

FIG. 5 illustrates an example graphical user interface for assistive resolution of unmapped patient intake data in accordance with one or more embodiments of the present application; and FIG. 6 illustrates an example graphical user interface configuring one or more record correlator machine learning models in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Clinical Workflow and Data Coordination System

Figure 1:
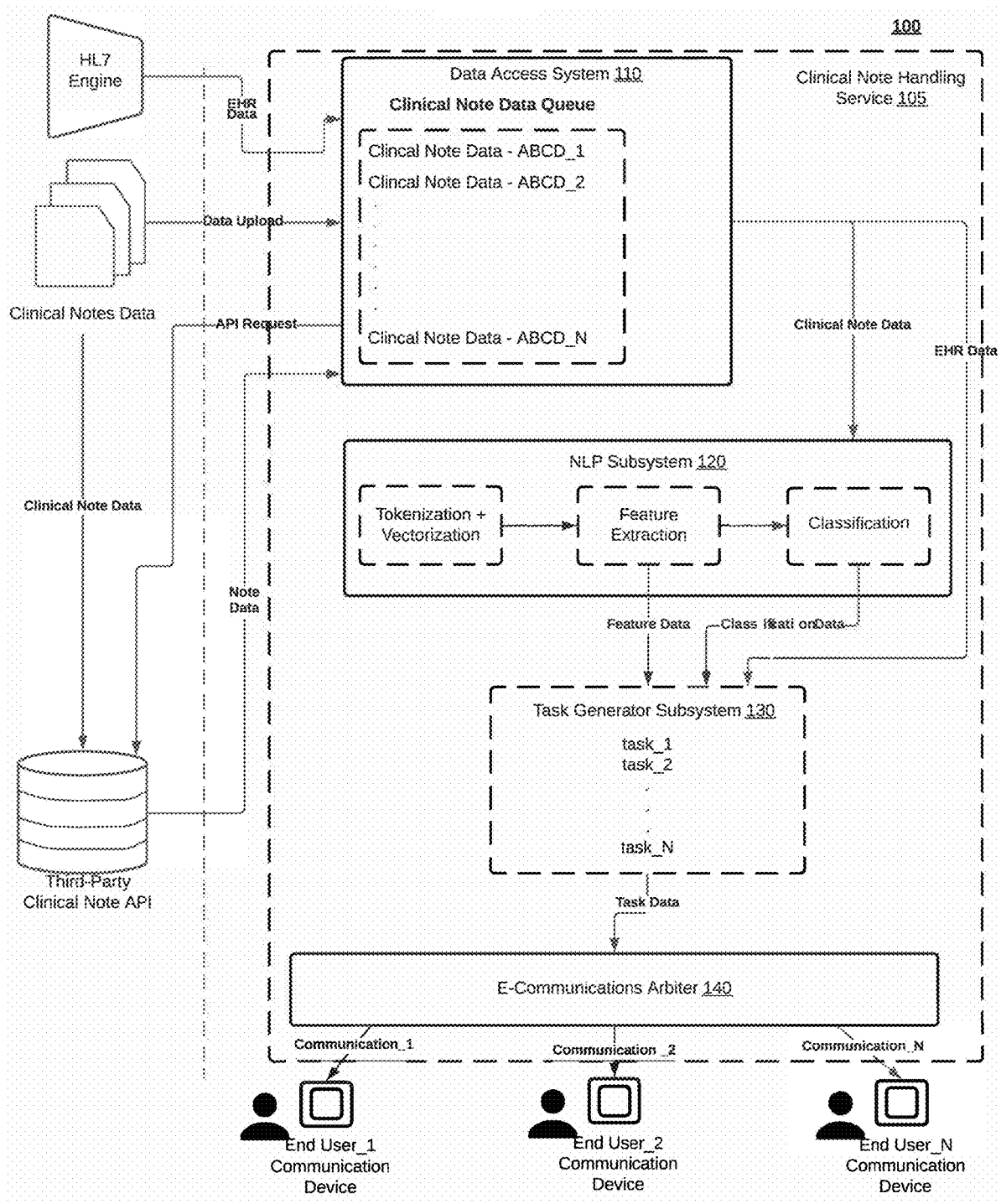
FIG. 1 illustrates a schematic representation of a system 100 in accordance with one or more embodiments of the present application.
Figure 1A:
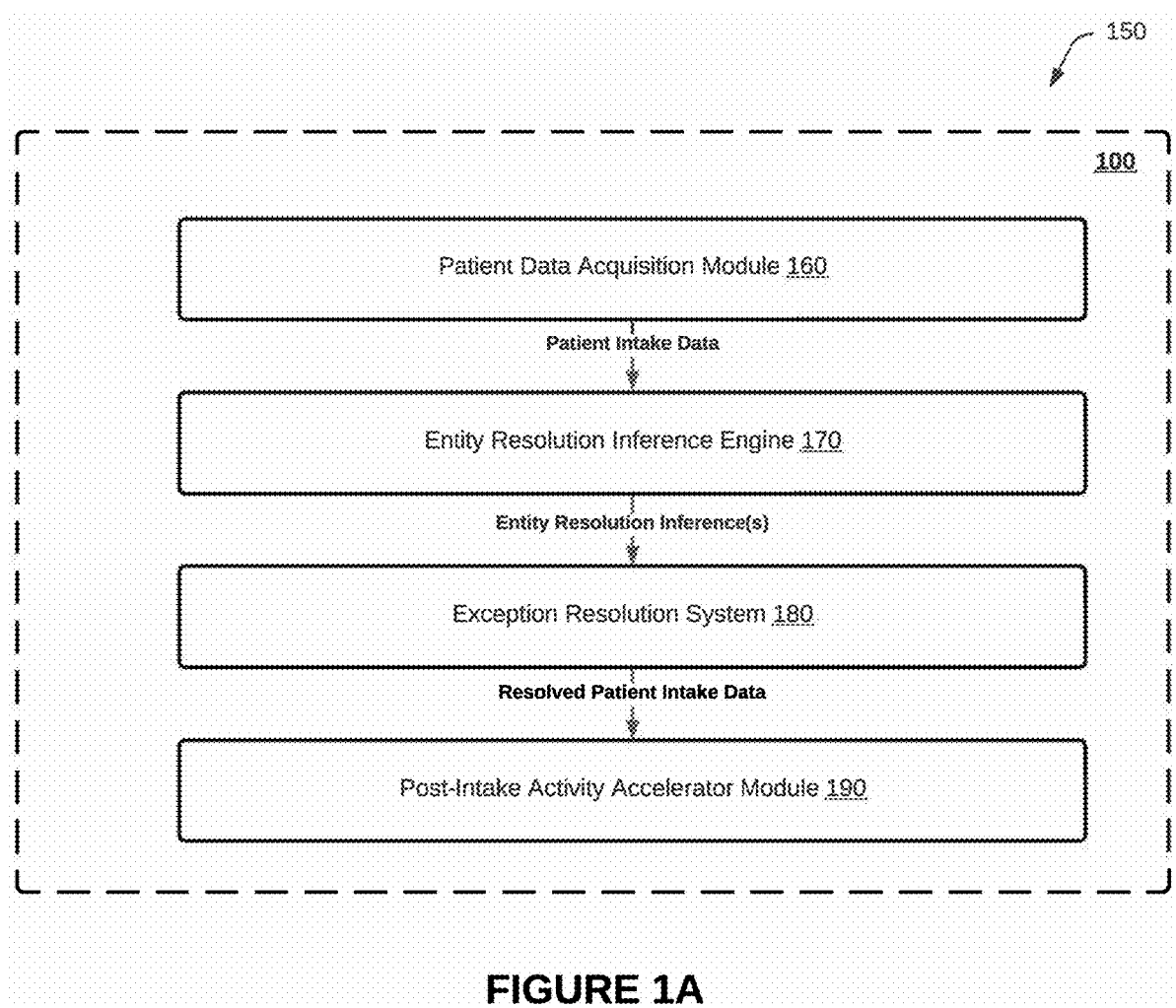
FIG. 1A illustrates a schematic representation of a subsystem of the system 100 in accordance with one or more embodiments of the present application.

As shown in FIGS. 1 and 1A, a clinical workflow and data coordination system 100 may include a clinical note handling service 105 and an entity resolution subsystem 150 (also referred to as a "remote record resolution service" in some portions of the disclosure). The service 105 and the subsystem 150 may each be configured to perform specific functions within the system 100 and operate independently of or in conjunction with one another. It shall be noted that while FIGS. 1 and 1A illustrate the system 100 as including both the clinical note handing service 105 and the entity resolution (e.g., remote record resolution) subsystem 150, other embodiments of the system 100 may only include one of these two components (or include other modules not explicitly depicted in FIGS. 1 and 1A).

The clinical note handling service 105, as illustrated in FIG. 1, may include a clinical note data access and intake subsystem 110, a feature extraction and classification subsystem 120, an automated task generation subsystem 130, and an electronic communications subsystem 140. Furthermore, as shown in FIG. 1A, the entity resolution subsystem 150 may include a patient data acquisition module 160, an entity resolution inference engine 170, an exception resolution system 180, and a post-intake activity accelerator module 190.

1.05 Clinical Note Data Handling and Automated Electronic Communications Service The clinical note data handling and automated electronic communications service 105 implementing the system 100, sometimes referred to herein as the "clinical note handling service 105" may be implemented by a distributed network of computers (e.g., hosted on the cloud, etc.) and may be in operable and control communication with each of the subsystems of the system 100 and/or third-party subsystems and services. That is, the clinical note handling service 105 may include a centralized controlling computer server(s) and associated computing systems that encourages and/or controls the intelligent and accelerated clinical note data handling, clinical note data classification, and clinical note data-informed communications routing operations of each of the subsystems, described herein, (e.g., subsystems 110-140).

1.1 Clinical Note Data Access+Intake Subsystem

The clinical note data access and intake subsystem 110, which may be sometimes referred to herein as the "data access system" 110, preferably functions to enable one or more electronic connections between the system 100 and one or more external systems of one or more subscribers to the clinical note handling service 105. The data access subsystem 110 may include one or more access modules that may function to establish or create content communication channels, which are sometimes referred to as "data handling nexus", between the system 100 and systems associated with subscribers to the service 105. In one or more embodiments, the data handling nexus may include any suitable medium and/or method of transmitting digital items between at least two devices including, but not limited to, a service bus, a digital communication channel or line, and/or the like.

Additionally, or alternatively, the clinical note data access and intake subsystem 110 may provide a web-based graphical user interface or web application that may enable one or more subscribers to upload clinical note data (e.g., clinical note CSV files, and/or the like) directly into the system 100.

In one or more embodiments, based on accessing or receiving clinical note data, the data access system 110 may function to store the clinical note data in a queue and preferably generate and/or associate identifying metadata including, but not limited to, a session identifier providing a unique identification value for a clinical session associated with a target clinical note, a patient identifier, a doctor identifier, a clinical note identifier, and/or the like. In such embodiments, the identifying metadata may be passed along with the clinical note data to one or more downstream subsystems (e.g., subsystem 120, subsystem 130, subsystem 140) to enable processing, tracking, account identification, and/or the like.

In one or more embodiments, the clinical note data handling service 105 may function to implement a clinical note data handling application programming interface (API) that enables programmatic communication, access, and control between the system 100 and the one or more sub-services within the system 100 and one or more (third-party) APIs associated with one or more subscribers to the clinical note data handling service 105.

Additionally, or alternatively, the data access system 110 may receive the clinical notes data via a health level seven (HL7) interface. In such embodiments, an electronic health record (EHR) system associated with a subscriber may periodically or in real-time send one or more HL7 messages comprising clinical note data and/or other types of electronic health record (EHR) data to the data access system 110. In turn, the data access system 110 may receive the one or more HL7 messages via a secure channel (e.g., port) of the clinical note handling service 105 and provide the one or more HL7 messages to the NLP subsystem 120.

1.2 NLP: Feature Identification+Extraction and Classification Subsystem

The feature extraction and classification subsystem 120, which may sometimes be referred to herein as a "NLP subsystem", preferably functions to perform various natural language processing tasks including extracting features from clinical note data and computing one or more classification inferences and/or labels for each clinical note file being handled by the clinical note data handling service 105. The NLP subsystem 120 may additionally include one or more text processing modules and/or machine learning models that may tokenize textual data within a clinical note and vectorize and/or generate embeddings for each set of tokens and further cluster the tokens into semantically-related token groups or the like.

In one or more embodiments, the NLP subsystem 120 includes a machine learning module or subsystem that may be intelligently configured to predict various classifications for each clinical note document including, but not limited to, identifying whether a clinical note has a clinical recommendation, a number of clinical recommendations in a given clinical note, a type of clinical recommendation, a strength of a clinical recommendation, an urgency of a clinical recommendation, and/or the like. In such embodiments, the NLP subsystem 120 may include a plurality of distinct machine learning-based classification submodules, which may be outlined herein below in the method 200.

Additionally, or alternatively, in some embodiments, the NLP subsystem 120 may include extensible feature extraction and classification heuristics that may be applied alone or in combination with one or more machine learning-based classifiers described herein.

Additionally, or alternatively, the NLP subsystem 120 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Automated Recommendation Task Generator

The automated recommendation handling task and instructions generator 130, which may be sometimes referred to herein as a "tasks generator" 130 or "automated task generation subsystem" 130, preferably functions to automatically generate a clinical recommendation registry including one or more tasks and/or one or more instructions for handling and/or disposing of clinical recommendations identified within a clinical note. In one or more embodiments, the task generator 130 may take in as input a set of extracted features and a set of classification inferences computed by the NLP subsystem 120 to compose and/or structure a given registry. It shall be noted that, in some portions of the disclosure, a "clinical recommendation registry" may be referred to as a "clinical recommendation worklist" or the like.

A given clinical recommendation registry preferably includes an enumeration of tasks and/or computer-executable instructions that may be automatically executed by the clinical note handling service 105. Additionally, or alternatively, the clinical recommendation registry may include patient session identifier (ID) data, clinical recommendation ID data, patient communications account data (e.g., email, phone number, messaging ID, etc.) that may be used as input in structuring one or more electronic communications to a given patient, as described herein and using at least e-communications arbiter 140.

Furthermore, in some embodiments, the task generator 130 may also be capable of ingesting additional electronic health record (EHR) data, such as appointment data, discharge data, transfer data, prescription data, and/or the like. This additional data may inform one or more operations of the task generator 130 and/or may be directly or indirectly provided as input to the e-communications arbiter 140 for structuring electronic communications to a given patient or other end users (e.g., a referring doctor, care team, etc.).

1.4 Automated E-Communications Arbiter & Routing

The electronic communications subsystem 140, which may be sometimes referred to herein as an "e-communications arbiter" 140, preferably functions to take in as input a clinical recommendation registry associated with a target clinical recommendation and structure, as output, an automated electronic communication scheme for handling and/or disposing of the target clinical recommendation. Accordingly, the e-communications arbiter 140 may function to intelligently select an optimal communication channel for communicating with an end user or patient, structuring communication parameters, such as a communication schedule and/or communication frequency and composing message content for each communication to the end user. In one or more embodiments, the e-communication arbiter may function to employ a selection matrix or the like for selecting a most optimal communication channel and may further employ pre-trained language models and/or messaging templates to compose messaging content for a given communication.

1.5 Entity Resolution Subsystem||Remote Record Resolution Service

The entity resolution subsystem 150 (also referred to herein as a "remote record resolution" service or subsystem) may be configured to handle and resolve unmapped entities (e.g., data discrepancies or inconsistencies) present in patient intake data. As illustrated in FIG. 1A, the entity resolution module 150 may comprise one or more modules 160-190 that are each configured to perform distinct functions. The functions performed by each of the sub-modules 160-190 will now be described below.

The patient data acquisition module 160 may function to obtain patient intake data from various medical entities or external sources. The patient intake data (e.g., data records) obtained by the patient data acquisition module 160 may include various types of information (e.g., data fields) about one or more patients, such as demographic information, medical history, insurance information, contact information, and/or any other relevant information that may aid in clinical workflow and data coordination processes.

The entity resolution inference engine 170 may implement one or more machine learning models (or an ensemble of machine learning models) that are specifically configured to generate entity resolution inferences for various types of data fields included in the patient intake data. For instance, in a non-limiting example, the engine 170 may implement an insurance plan entity resolution model. The insurance plan entity resolution model may be specifically configured to predict system-recognized insurance plan identifiers that likely correspond to the insurance information (e.g., data fields) included in the patient intake data.

Similarly, the entity resolution inference engine 170 may additionally or alternatively implement other entity resolution models such as a referring doctor entity resolution model, a patient entity resolution model, a patient match entity resolution model, a patient type entity resolution model, a point of origin entity resolution model, a location entity resolution model, a patient relationship entity resolution model, a patient reinstatement entity resolution model, and/or the like. Each of these models may be specifically trained to handle their respective data fields and generate entity resolution inferences accordingly.

The exception resolution system 180 may be configured to handle special cases or exceptions that may arise during the entity resolution process. The exception resolution system 180 may be particularly useful when the entity resolution inference engine 170 is unable to generate a prediction (e.g., validated data record prediction) with at least a threshold amount of confidence or when there are multiple potential matches (e.g., multiple validated data records) for a given data discrepancy (e.g., unmapped entity or data record).

In such cases, the exception resolution system 180 may present, via a record mapping error queue, a user with a list of potential matches for manual confirmation. Additionally, or alternatively, the exception resolution system 180 may be configured to handle cases where a new entity is encountered that does not match any existing record in a database. In such cases, the system 180 may be configured to create an entry in the database for the new entity, thereby expanding the system's knowledge base and improving its ability to handle diverse and evolving data.

The post-intake activity accelerator module 190 may use the resolved patient intake data to streamline various post-intake workflows or procedures such as patient billing, insurance claim submissions, and/or the like. For example, once the correct payer (e.g., insurance provider) is identified through the entity resolution process, the module 190 may query a database for payer-specific rules and codes applicable to the identified payer. These payer-specific rules and codes may then be referenced during one or more operations of the system 100 to construct insurance claims that adhere to the specific requirements of the payer (e.g., target entity).

2. Method for Automated and Assistive Resolution of Unmapped Patient Intake Data Using Machine Learning Models As shown in FIG. 2, a method 200 for automated and assistive resolution of unmapped patient intake data may include obtaining patient intake data (S210), computing entity resolution inferences (S220), resolving unmapped patient intake data (S230), and accelerating post-intake medical activities (S240).

As will be described herein, method 200 may address many technical problems observed with data records received from a third-party system (e.g., external system). Such data records are typically of poor data quality and often contain inaccuracies, inconsistencies, and incomplete fields. These issues commonly arise due to manual data entry errors, different data formats, or discrepancies in data handling processes between systems. Poor quality data can lead to operational inefficiencies, system malfunctions, and inaccurate outputs if not corrected. The manual correction of these errors is not only resource-intensive but also fails to scale effectively when dealing with a large amount of third-party data records (e.g., 500, 1,000, 5,000, 10,000, 100,000 400,000, etc. data records per day, week, month, etc.). Method 200, as described herein, may provide an automated, scalable solution that minimizes manual intervention and improves the quality of data being processed.

Furthermore, a common technical challenge is the occurrence of mapping errors in the data received from third-party systems. These errors may occur when specific data fields from the third-party systems cannot be properly linked to corresponding validated records in a validated database (e.g., an internal database), often due to differences in data standards, missing information, or erroneous entries. Such mapping failures may undermine the system's ability to process data reliably, thus leading to inefficiencies or failed operations. Method 200 may address this by using machine learning models to compute entity resolution inferences, which may automatically detect and resolve these mapping errors.

Method 200 may reduce or mitigate the above-described technical problems by automating data resolution using machine learning. The machine learning-based approach may significantly reduce the reliance on manual interventions, thus ensuring that large-scale data inconsistencies are resolved automatically. The automated nature may be particularly effective when dealing with large datasets that would be impractical or costly to handle manually.

Furthermore, method 200 may also address technical challenges associated with scalable and efficient data processing. Method 200 may be configured to adapt to the scale of the data, processing records in real-time or in batches as necessary. Such flexibility may allow method 200 to handle vast amounts of third-party data and thus, overcome the limitations of manual processes that struggle to scale effectively.

Method 200 may also improve data resolution between an external system and a validated system by implementing a confidence-based entity resolution process. The machine learning models described herein may generate inferences with associated confidence scores. Such confidence scores may allow method 200 to determine whether to automatically map data (e.g., data records) or request manual confirmation. Dynamic thresholding may help balance automation with accuracy, ensuring that only data records with high confidence levels are automatically resolved, while lower-confidence records are flagged for manual review. Accordingly, in some embodiments, method 200 may ensure that ambiguous data records are handled with greater attention or care.

Another technical improvement provided by method 200 may relate to dynamic model selection. Method 200 may intelligently select the most appropriate machine learning model based on the specific data field responsible for the discrepancy. Each mapping error may be addressed using the best possible model, thus increasing the reliability and accuracy of the data resolution process.

In addition, method 200 may include a feedback loop for continuous improvement, which may allow a system implementing method 200 to learn from user inputs and past resolutions. The active learning mechanism may fine-tune (e.g., retrain) the machine learning models implemented herein over time, thus making such models more adaptive and responsive to new data records (and discrepancy errors).

To further enhance usability, method 200 may provide a graphical user interface (GUI) that enables users to configure machine learning models, adjust execution frequencies, and fine-tune confidence thresholds. Such an interface may offer greater flexibility by allowing users to control and customize the resolution process to meet specific user requirements. For example, a dynamic slider may be displayed for adjusting confidence levels that determine the degree of automation implemented by method 200, thus allowing for better control over the balance between automated and manual resolutions.

2.10 Acquisition of Patient Intake Data

S210, which includes obtaining patient intake data, may function to receive or source patient intake data (also referred to as "data records") from one or more medical entities or external sources. In some embodiments, the patient intake data obtained via S210 may include various types of information or data fields about one or more patients, such as demographic information, medical history, insurance information, contact information, and/or any other relevant information that may aid in clinical workflow and data coordination processes. For instance, in a non-limiting example, the patient intake data may include one or more data entries or data records that each correspond to a specific patient (e.g., entity) and include a set of one or more data fields that store values, such as the demographic information, medical history, insurance information, contact information of the specific patient.

In some embodiments, the patient intake data obtained by S210 may be "noisy," meaning it may contain inaccuracies, inconsistencies, discrepancies, or incomplete information. This noise in the patient intake data may be present for various reasons including, but not limited to, manual data entry errors, miscommunication between a healthcare professional and a patient when collecting and inputting such data, variations in data formatting, discrepancies in data collection practices among different medical entities, and/or the like. As will be described in more detail herein, such noisy patient intake data if used by a system or service may potentially cause unintended operating behavior, interruptions, or errors. Accordingly, the embodiments described herein provide technical solutions that aim to address these challenges and reduce overall manual user intervention required to "de-noisify" the patient intake data (e.g., data records). It shall be noted that the process of manually removing or resolving noise from the patient intake data is not only burdensome, expensive, and time consuming, but also fails to scale in instances where the patient intake data may have hundreds, thousands, or millions of data discrepancies.

In some embodiments, the patient intake data received by S210 may originate from healthcare providers. These could include, but are not limited to, hospitals, clinics, private practices, laboratories, or any other entity involved in the provision and delivery of healthcare services. The patient intake data (e.g., data records such as EHR data records or HL7 data records) may be received from these entities via any suitable technique or technology. For instance, in a non-limiting example, the patient intake data may be received electronically via secure data transfer protocols, uploaded manually by healthcare professionals, automatically collected through integrated healthcare information systems or electronic health record (EHR) systems (e.g., an HL7 engine described in FIG. 1), or the like.

In some embodiments, the patient intake data may be received in batches at pre-determined intervals, such as hourly, daily, weekly, or monthly. The interval at which S210 receives the patient intake data may be configured or determined by the one or more medical entities and/or may be based on specific requirements or capabilities of the one or more medical entities. Alternatively, in some embodiments, the patient intake data may be received in real-time or near real-time, thus allowing for timely updates and processing of patient information. It shall be noted that, in some embodiments, the "patient intake data" may be referred to as "data records," "unmapped data records," and/or the like.

2.20 Computing Entity Resolution Inferences

S220, which includes computing entity resolution inferences, may function to implement one or more machine learning models (or an ensemble of machine learning models) to support or aid in the resolution of data discrepancies (e.g., mapping errors) in the patient intake data. Data discrepancies in the patient intake data, as generally described herein, may occur or be detected when a piece of data, such as a value of a data field in the patient intake data (e.g., a data record included in the patient intake data), cannot be mapped, linked or associated with a validated data object or data record (e.g., is not equivalent to another data field of the validated data record). This lack of association could be due to various reasons such as data entry errors, differences in data standards across different systems, or incomplete or missing data. In some embodiments, processes of S220 (or S210, S230, S240, etc.) of method 200 may be executed based on or in response to detecting one or more data discrepancies or mapping errors in the patient intake data.

For instance, as previously described above, an (e.g., unmapped) data record of the patient intake data may include one or more insurance plan data fields that store information about an insurance plan associated with a subject patient, such as a name of the insurance plan associated with the subject patient, an address of the insurance plan associated with the subject patient, a city of the insurance plan associated with the subject patient, a state of the insurance plan associated with the subject patient, a zip code of the insurance plan associated with the subject patient, and/or the like. However, due to various reasons such as data entry errors, the data field storing the name of the insurance plan may not result in a literal text match with any record in a database table comprising validated insurance plans (e.g., validated data records). Accordingly, in such embodiments, based on detecting the mapping error between the unmapped data record and the plurality of validated data records, one or more processes of at least S220 and/or S230 may be used to generate a one or more resolution candidate records for the unmapped data record.

It shall be noted that the above example is not intended to be limiting and that the role of S220 may extend beyond resolving discrepancies in insurance plan data records, as described in more detail herein. For instance, similar data inconsistency challenges may arise in various other aspects/types of the patient intake data, such as in patient information data, patient demographics data, patient medical history data, patient contact information data, referring doctor data, point of origin data, patient type data, service location data, and/or the like. These discrepancies, analogous to the example described above, may form due to a variety of reasons including variations in spelling of a physician's name, differences in the format of the physician's credentials, variations in spelling of a patient's name, discrepancies in account numbers or differences in account types, inconsistencies in the representation of the patient's medical history, and/or the like.

Insurance Plan Entity Resolution Model

In some embodiments, the one or more machine learning models implemented by S220 may include an insurance plan entity resolution model. The insurance plan entity resolution model may be specifically configured to receive, as input, a set of features derived directly or indirectly from insurance-related data fields included in the patient intake data. Based on receiving the set of features, the insurance plan entity resolution model may then process this input and predict (e.g., compute) one or more system-recognized insurance plan identifiers that likely relate to the input data (commonly referred to as "inferences," "model inferences," "record correlation inferences," or the like). It shall also be noted that, in some portions of the disclosure, the one or more machine learning models of S220 may be referred to as one or more "record correlator machine learning models."

Figure 3:
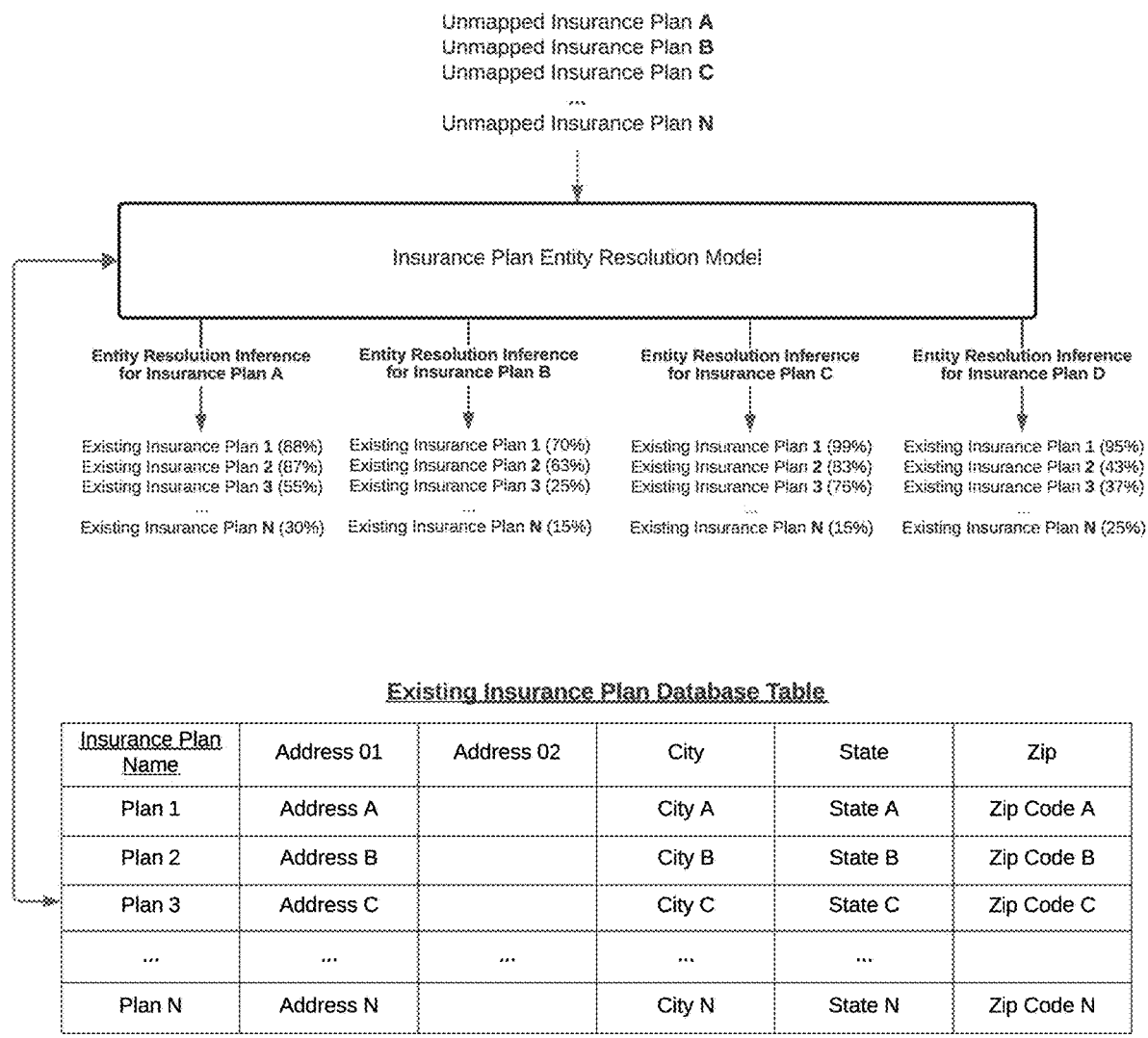
FIG. 3 illustrates example outputs of an entity resolution model in accordance with one or more embodiments of the present application.

Stated another way, as generally illustrated in FIG. 3, an inference produced by the insurance plan entity resolution model (e.g., a record correlator machine learning model) may include a set of one or more system-recognized insurance plan identifiers. These one or more system-recognized insurance plan identifiers may be predicted based on the input data and correspond to the likely insurance plan(s) associated with a subject patient. The model inference(s) may also include a confidence score for the predicted identifiers that indicate the certainty or confidence in the prediction made by the insurance plan entity resolution model, as also illustrated in FIG. 3 (e.g., Entity Resolution Inference A for Unmapped Insurance Plan A: {Existing Insurance Plan 1 (88%), Existing Insurance Plan 2 (87%), Existing Insurance Plan 3 (55%), Existing Insurance Plan N (30%)}. It shall be noted that, in some portions of the disclosure, each identifier+confidence score pair illustrated in FIG. 3 may be referred to as an inference.

In some embodiments, the system-recognized insurance plan(s) that the insurance plan entity resolution model uses to generate predictions may be derived from a computer database table maintained by a system or service implementing the method 200 (e.g., a remote record resolution service). The database table may comprise a plurality of (validated) database records that each correspond to a respective insurance plan that the system or service is capable of processing. Each database record, in some examples, may include a plurality of data fields that store information about the respective insurance plan, such as the insurance plan identifier, the name of the insurance company, the type of insurance plan, the address of the insurance company, and/or other relevant details. Accordingly, in some embodiments, the insurance plan entity resolution model may use at least a subset of the data included in such a database table to match model input data with the likely correct insurance plan(s).

For instance, in a non-limiting example, the patient intake data obtained by S210 may include—among others—an insurance plan data record for a patient named "John Doe." The received insurance plan data record may include data fields that indicate the name of the insurance plan as "Health Insurance Co.", the type of the insurance plan as "PPO," the address of the insurance plan as "P.O. Box 23456," the city of the insurance plan as "Charlotte," the state of the insurance plan as "NC", and the zip code of the plan as "28105."

In turn, based on an identification of this insurance plan data, S220 may provide such insurance plan data, optionally in a vectorized form or representation computed via a record vectorization model, as input to the insurance plan entity resolution model (e.g., a record correlator machine learning model). The insurance plan entity resolution model may then process this input and predict the likely system-recognized insurance plan identifier(s) (e.g., one or more of plans 1-N) that relate to the input data. For instance, in one example, the insurance plan entity resolution model may generate one or more inferences predicting that the input data relates to the system-recognized insurance plan identifiers 1-N with an 88%, 87%, 55%, and 30% confidence score, respectively.

It shall be noted that the above example is not intended to be limiting and that the insurance plan entity resolution model may generate (e.g., record correlation inferences) inferences based on insurance data associated with additional, different, or fewer patients, entities, or data records without departing from the scope of disclosure. Furthermore, it shall also be emphasized that in some embodiments of the example, the system-recognized insurance plan identifier(s) outputted by the insurance plan entity resolution model may be derived from a database table that includes validated data records corresponding to the insurance plan identifiers 1-N (among others).

Additionally, it shall be noted that the machine learning models of S220 may receive vectorized inputs. These inputs may be vector representations of unmapped data records, which may be generated by processing the data fields of each record through a record vectorization model. The machine learning-based record correlator may then use these vectorized inputs to compute correlation inferences by comparing them with the vector representations of validated records.

Other Exemplary Entity Resolution Models

In some embodiments, S220 may additionally or alternatively implement one or more other entity resolution models (e.g., one or more other record correlator machine learning models) that are specifically configured to address specific data record domains associated with the patient intake data. Examples of such other entity resolutions may include, but should not be limited to, referring doctor entity resolution models, patient entity resolution models, patient type entity resolution models, point of origin entity resolution models, location entity resolution models, patient relationship entity resolution models, patient reinstatement entity resolution models, and/or the like. These entity resolution models, in some embodiments, may have one or more similar characteristics as the insurance plan entity resolution model described above and/or may be trained to handle distinct data categories relevant to the patient intake data obtained by S210.

In other words, additional or alternative entity resolution models implemented by S220 (e.g., the patient entity resolution models, patient type entity resolution models, point of origin entity resolution models, location entity resolution models, relations entity resolution models, patient reinstatement entity resolution models, and/or the like) may have similar operating characteristics as the insurance plan entity resolution model, but for their designated entity resolution domains.

Training Entity Resolution Models

In some embodiments, the entity resolution models described herein may be trained based on one or more training datasets. The one or more training datasets, in some embodiments, may include one or more training data samples of patient intake data with known outcomes, such as correctly identified insurance plans, referring doctors, patient types, points of origin, locations, patient relationships, and/or the like.

In some embodiments, S220 may function to provide the training dataset(s) as input to the entity resolution model(s) (e.g., machine learning classification models). In turn, the entity resolution model(s) may function to learn from these training data samples to identify patterns and relationships between the input data and the known outcomes.

In some embodiments, the training process may involve adjusting parameters of the entity resolution model(s) to minimize a difference between the predictions of the entity resolution model(s) and the known outcomes in the training dataset. This process referred to herein as "model learning" may involve iterative updates to the model's parameters based on a loss function that quantifies the difference between the model's predictions and the known outcomes. The learning process may continue until the model's performance on the training data reaches a satisfactory level.

Once trained, the entity resolution model(s) may be used to make predictions on new patient intake data. For instance, given a new set of insurance plan data, the insurance plan entity resolution model may be able to predict the likely system-recognized insurance plan identifiers that relate to the input data. Similarly, given a new set of referring doctor data, the referring doctor entity resolution model may be configured to predict the likely system-recognized referring doctor identifiers that relate to the input data, and so on for the other entity resolution models.

It shall be noted that the training process described above is just one possible approach to training the entity resolution model(s), and other machine learning techniques and algorithms may be used without departing from the scope of the disclosure (e.g., ensemble training methods, etc.). Furthermore, the performance of the entity resolution models may be evaluated and improved over time through a process of continuous learning, where the models are periodically retrained with new data and their predictions are validated against known outcomes (as described in more detail in S230), and/or machine learning ensembling (e.g., combining and weighting predictions of multiple machine learning models).

For example, in some embodiments, the entity resolution model(s) may be trained using ensemble training techniques, wherein multiple machine learning models may be combined to improve prediction accuracy. During ensemble training, different models may be trained independently on the same or varying subsets of the training data, leveraging different algorithms, such as decision trees, parametric or non-parametric machine learning classifiers, neural networks, or support vector machines. The outputs of these models may then be aggregated through techniques such as model bagging, boosting, or stacking. In one example, the individual model predictions may be weighted based on their performance, and the final prediction may be a weighted average or majority vote. The ensemble approach can enhance robustness by reducing model bias and variance, and the overall system performance can be further refined through periodic retraining with new data and feedback loops described below.

Graphical User Interface for Configuring Record Correlator Machine Learning Models In some embodiments, S230 may display a graphical user interface for configuring and/or controlling operations of one or more record correlator machine learning models stored at or accessible by a record correlator machine learning model database of the remote record resolution service. As generally illustrated in FIG. 6, the graphical user interface may include a user interface table component or a grid-like component that lists the record correlator machine learning models available to the remote record resolution service. Each row (e.g., entry) within the user interface table or grid-like component may correspond to a specific record correlator machine learning model and may include one or more (interactive) elements for configuring the operations of the specific record correlator machine learning within the remote record resolution service.

For instance, a respective row may display text indicating the name of the respective record correlator machine learning model. Additionally, or alternatively, the respective row may include an enable toggle button for activating or deactivating the respective record correlator machine learning model in the remote record resolution service. The respective row may further include a plurality of user interface input fields for specifying an execution frequency of the respective record correlator machine learning model. These input fields may allow the user to configure how often the model should run, such as every four hours or once daily, and/or the like. Additionally, in some embodiments, the respective row may include a user interface input field for setting a start time to begin executing the respective record correlator machine learning model.

Furthermore, in some embodiments, the respective row may include a plurality of user interface input fields for specifying a span of time to avoid executing the respective record correlator machine learning model. For example, users can configure the model to avoid running during peak hours or system maintenance windows. In some embodiments, the respective row may also include an adjustable slider user interface component for defining a threshold (confidence) range that requires a user to confirm the resolution candidate record predicted by such model when an inference associated with the resolution candidate record falls within the threshold range. It shall be noted that this user interface component may enhance the accuracy of the resolution process by ensuring that inferences with moderate confidence levels (e.g., between 40% and 70%) are reviewed by a user before being applied.

Additionally, the respective row may include a user interface text field that visually indicates that the remote record resolution service will automatically resolve the unmapped data record to the resolution candidate record when the inference associated with the resolution candidate record exceeds a pre-defined maximum confidence threshold. For example, if the confidence level exceeds 88%, the system may automatically finalize the resolution without requiring user intervention.

Dynamic Model Selection Based on Data Field Mapping Errors

As described above, in some embodiments, the unmapped data record may include a plurality of data fields. Based on the respective data field causing the mapping error between the unmapped data record and the plurality of validated data records, S220 may dynamically select a record correlator machine learning model to address the mapping error (e.g., discrepancy). For example, S220 may determine that the mapping error is associated with a first respective data field of the unmapped data record (e.g., insurance plan field), and based on this determination, elect a first record correlator machine learning model to resolve discrepancies associated with the first respective data field. Conversely, in another non-limiting example, S220 may determine that the mapping error is associated with a second respective data field of the unmapped data record (e.g., a referring doctor field), and based on this determination, elect a second record correlator machine learning model to resolve discrepancies associated with the first respective data field.

Furthermore, in some embodiments, the mapping error may be attributed to both the first and second respective data fields of the unmapped data record. In such cases, S220 may dynamically elect both the first and second record correlator machine learning models, wherein each model addresses the discrepancies associated with its respective data field. In such an example, the first record correlator machine learning model may compute a plurality of first record correlation inferences by comparing the first respective data field of the unmapped data record to the validated data records, while the second record correlator machine learning model may compute a second plurality of record correlation inferences by comparing the second respective data field of the unmapped data record to the validated data records.

Once both sets of inferences are computed, the S230 may identify the record correlation inference from the first plurality and the second plurality of correlation inferences that has a confidence score greater than a predefined maximum confidence threshold. For example, if the first record correlator model predicts that a particular insurance plan has an 88% confidence score of matching the unmapped data record, and the second record correlator model predicts that a specific referring doctor has a 90% confidence score, these two inferences may be selected for further processing by S220.

In some embodiments, following the identification of the highest confidence inferences, S230 may query a computer database to retrieve validated data record associated with the first record correlation inference (for the first respective data field) and a second validated data record associated with the second record correlation inference (for the second respective data field). In response to the query results, S230 may proceed to set the validated data record associated with the first record correlation inference as the resolution candidate record for the first respective data field. Similarly, the system may set the second validated data record associated with the second record correlation inference as the resolution candidate record for the second respective data field. It shall be noted that, by generating resolution candidate records for each data field separately, S230 may ensure that discrepancies are accurately resolved for both the first and second respective data fields, leading to a more robust and accurate entity resolution process.

Assistive and/or Automated Entity Resolution of Data Discrepancies in Patient Intake Data S230, which includes resolving patient intake data discrepancies, may function to use the entity resolution (e.g., record correlation) inferences generated by S220 to accelerate a resolution of one or more data discrepancies present in the patient intake data (e.g., an unmapped data record of the patient intake data). In some embodiments, an output or result of S230 may be a successful resolution, mapping, or correlation between the one or more data discrepancies in the patient intake data and their corresponding validated data entries or records within a computer database of a system or service implementing the method 200.

In some embodiments, the confidence score associated with the entity resolution inferences generated by S220 may guide S230 in determining whether to proceed with automated entity resolution (e.g., automated data record mapping) or route an unmapped data record to a record mapping error queue (e.g., seek manual confirmation from a user before proceeding). As previously described above, the confidence score associated with a respective entity resolution inference may refer to a quantifiable (e.g., numerical) measure, between 0% and 100%, of a machine learning model's certainty in the accuracy of the inferred resolution.

Automated Entity Resolution

Figure 4:
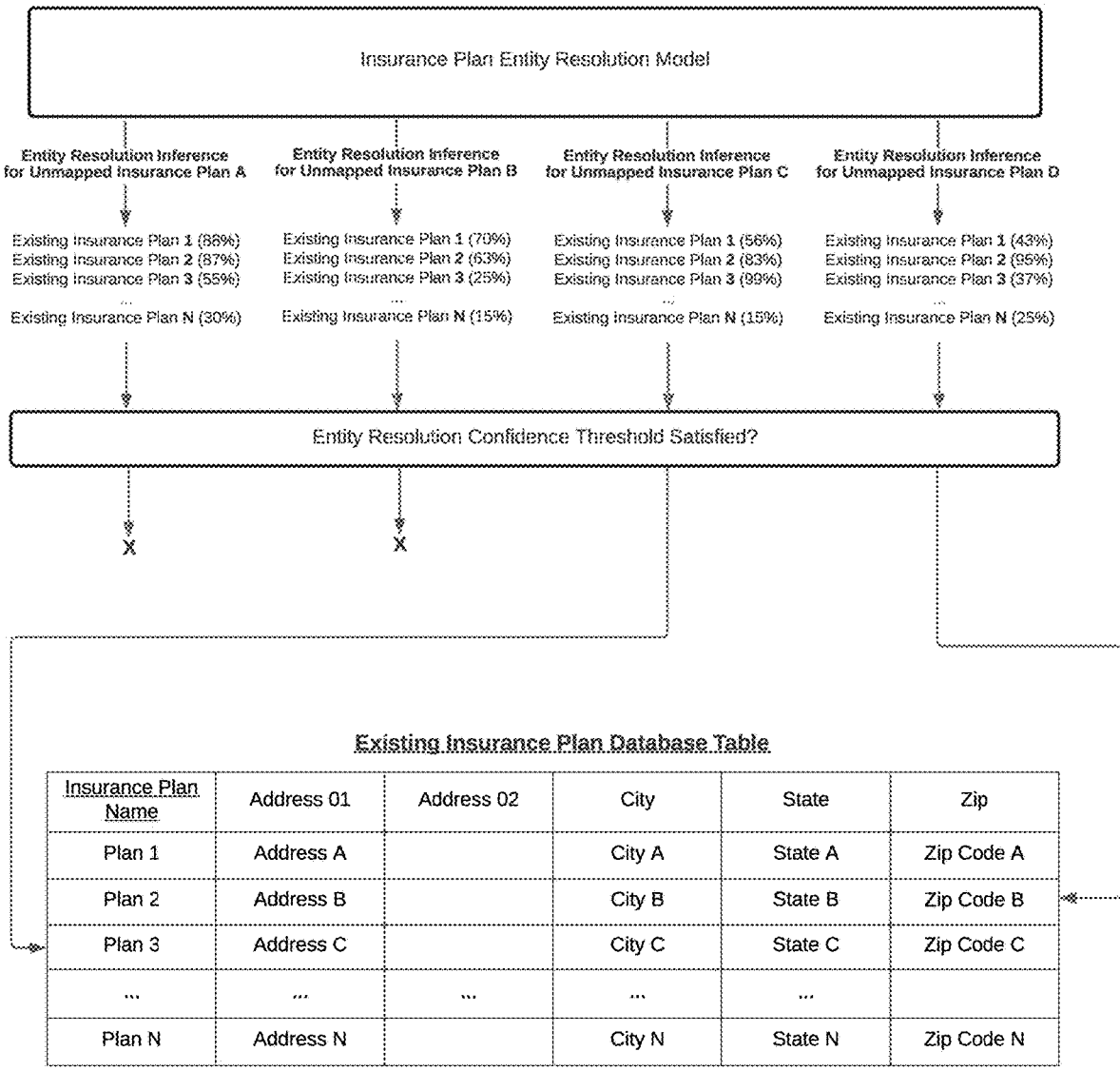
FIG. 4 illustrates an example schematic for automatically resolving unmapped patient intake data in accordance with one or more embodiments of the present application.

As generally illustrated in FIG. 4, in some embodiments, when S230 identifies that a confidence score of an entity resolution inference computed by the entity resolution machine learning model(s) of S220 exceeds or surpasses a predetermined maximum confidence score threshold ("predefined maximum confidence threshold"), S230 may function to automatically resolve, map, or link the data discrepancy (e.g., data field) associated with such inference to the corresponding data record or entry in a database of the system or service. For instance, in a non-limiting example, the insurance plan entity resolution model may generate an entity resolution inference predicting that the insurance plan name "BCBS PPO" likely relates to the system-recognized insurance plan name "Blue Cross Blue Shield PPO" with a confidence score that meets or exceeds the predetermined confidence score threshold. Accordingly, as a result, S230 may function to automatically link or map the insurance plan name "BCBS PPO" in the patient intake data (e.g., map the associated unmapped data record) to the corresponding "Blue Cross Blue Shield PPO" validated data record in the database of the system or service.

Such automated mapping may effectively resolve the discrepancy in the insurance plan name field of the patient intake data, thereby ensuring the accuracy of the patient's insurance information. It shall be noted that this automatic mapping not only enhances the efficacy of the data used by the system or service implementing the method 200, but also significantly reduces manual effort and time spent on resolving data discrepancies in the patient intake data.

As described above, in some embodiments, a record correlation inference may include a confidence score of a potential match or resolution between the unmapped data record and a respective validated data record of the plurality of validated data records. Accordingly, in some embodiments, generating a resolution candidate for the unmapped data record may include querying a computer database for the respective validated data record that is associated with the record correlation inference. Additionally, in some embodiments, in response to the querying of the computer database, S230 may set or use the obtained validated data record as the resolution candidate record for the unmapped data record.

In some embodiments, S230 may utilize a specific data structure to store the mapping or association between the identified discrepancy and the corresponding data record. Examples of such data structures may include, but should not be limited to, a table, a graph, a tree, or any other suitable data structure that allows for efficient storage and retrieval of data.

For instance, in a table-based data structure, S230 may create a new row for every successful mapping. Each row may contain fields such as the original data entry (e.g., "BCBS PPO"), the corresponding data record in the database (e.g., "Blue Cross Blue Shield PPO"), the confidence score of the entity resolution inference, and/or the like. This table may then be used to quickly look up the correct data record for a given data entry, thereby speeding up the resolution of future discrepancies.

Regardless of the specific type of data structure used, S230 may periodically update this data structure as new discrepancies are identified and resolved, and as new data records are added to the database. This may ensure that the data structure remains up-to-date and continues to provide accurate and efficient resolution of data discrepancies.

Figure 5:
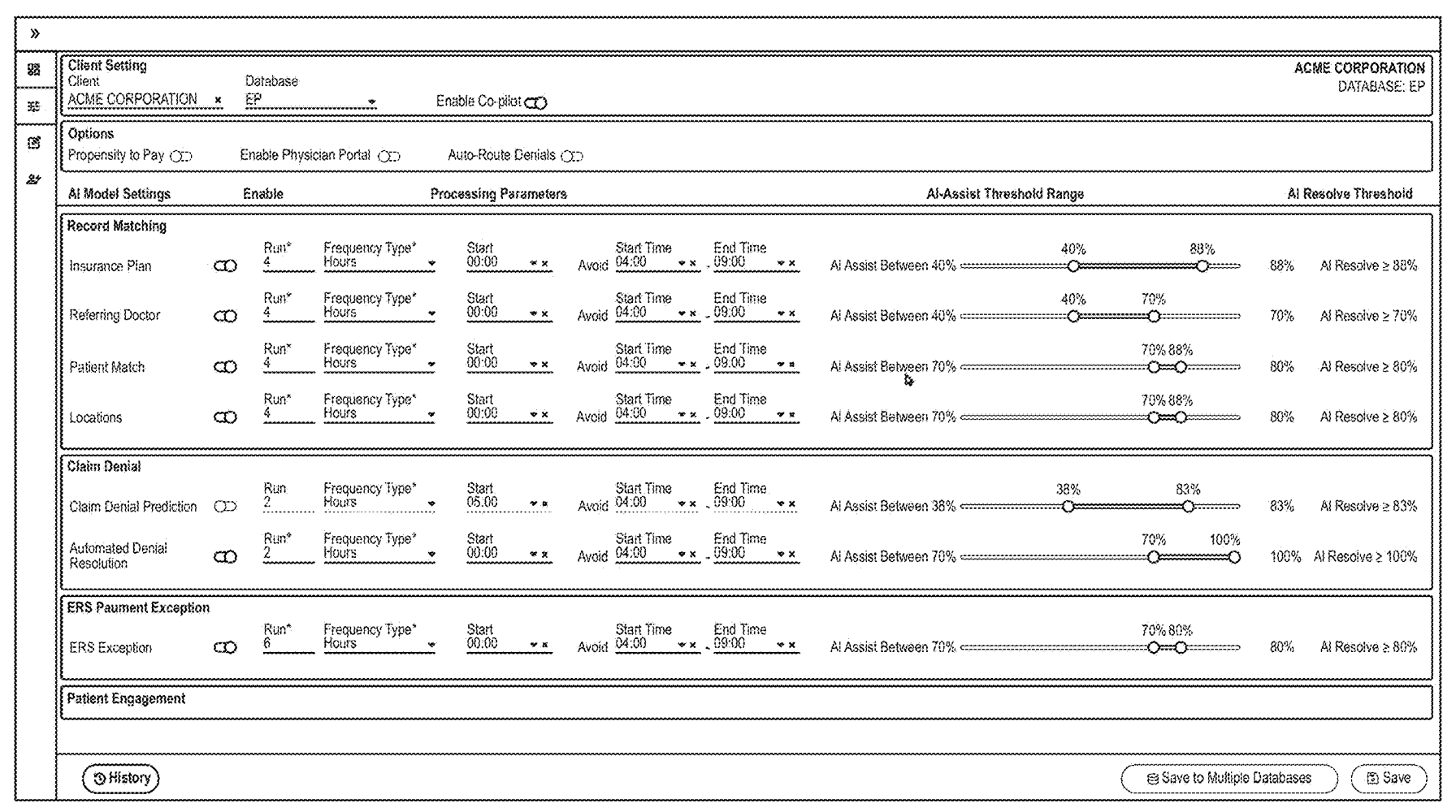

It shall be noted that in embodiments where S220 has identified that a plurality of record correlation inferences exceeds a pre-defined maximum confidence threshold, the record correlation inference with a highest value may be elected. For example, Assistive Entity Resolution In some instances, none of the entity resolution inferences generated in S220 may exceed the predetermined confidence score threshold (or may be between a pre-defined minimum confidence threshold and a maximum confidence threshold, as described earlier). In such instances, as generally illustrated in FIG. 5, S230 may instead route the unmapped data record or entity in question to a record mapping error queue for presenting a list of one or more system-recognized entities (e.g., validated data records) that potentially match the unmapped data record or entity in question for manual confirmation or selection. The list of potential matching entities, in some embodiments, may be generated based on entity resolution inferences that fall within a predetermined confidence range (e.g., a pre-defined minimum confidence threshold and a maximum confidence threshold). For instance, in a non-limiting example, if the insurance plan entity resolution model generates an entity resolution inference predicting that an inputted insurance plan name likely relates to one of several system-recognized insurance plans with less than a threshold amount of confidence, S230 may respond by presenting the user with a list of insurances plans that relate to entity resolution inferences having confidences scores within the predetermined confidence score range (e.g., between a pre-defined minimum confidence threshold and a pre-defined maximum confidence threshold).

In some embodiments, as generally illustrated in FIG. 5, the record mapping error queue may display the unmapped data records in an unmapped records table and display validated data records that likely resolve a currently selected unmapped data record in a validated records table. For instance, as generally illustrated in FIG. 5, the entry in the unmapped records table corresponding to the plan name "Amerigroup Star Plus MMP" is currently selected. Accordingly, based on S230 detecting this selection, S230 may load one or more entries in the validated records table (e.g., existing records table) that correspond to insurance plans that likely resolves the currently selected entry.

Stated another way, the entries in the validated data records table may be those whose record correlation inferences have a confidence score between a pre-defined minimum confidence threshold and a pre-defined maximum confidence threshold. Accordingly, if only one validated data record meets this criterion, it will only be displayed in the validated records table. However, if multiple records meet the threshold, S230 may display a plurality of validated data records, allowing the user to view and select from multiple potential matches.

In some embodiments, the list of potentially matching system-recognized entities presented to the user may be dynamically changed or updated based on input from a user. For instance, as also shown by way of example in FIG. 5, S230 may display the list of potentially matching system-recognized entities in association with a slidable user interface object (e.g., range slider user interface component). The slidable user interface object may be configured to allow a user to adjust the confidence score range used to generate the list of potentially matching system-recognized entities, thus allowing S230 to dynamically update in real-time to reflect the new range (e.g., forgo displaying records that don't adhere to the new range and maintaining display of the records that satisfy the new range).

For example, when S230 detects that the user slides an "adjustable knob" or "control knob" of the slidable user interface object towards one end of the slidable user interface object, S230 may increase a lower range of the predetermined confidence range accordingly and, in real-time, refine the list to include system-recognized entities that only relate to entity resolution inferences having confidences scores within the new confidence score range. Conversely, in some embodiments, when S230 detects that the user slides the "adjustable knob" or "control knob" of the slidable user interface object towards the other end of the slidable user interface object, S230 may decrease a lower range of the predetermined confidence range accordingly and, in real-time, expand the list to include system-recognized entities that relate to entity resolution inferences having confidences scores within the newly defined confidence score range.

It shall be noted that many technical advantages occur from the above-described embodiments, including providing a user with (e.g., real-time) control over the confidence score range used for entity resolution, thereby allowing for a more tailored and efficient entity resolution process. It shall also be noted that, while the above-described embodiments utilize a slidable user interface object to adjust the confidence score range, any other suitable user interface object or method may be used to adjust the confidence score range without departing from the scope of the disclosure. For example, a dropdown menu, a set of radio buttons, a text input field, or any other user interface element that allows for the input of a confidence score range.

Additionally, as shown in FIG. 5, the record mapping error queue may display both the unmapped records table and the validated records table in side-by-side columns to facilitate easy user review. The unmapped records table may include a plurality of columns, each labeled to identify specific data fields of the unmapped data records, such as names, addresses, or other attributes. Each unmapped data record entry stores its respective values across these labeled columns, allowing users to see a breakdown of the record's details. Conversely, the validated records table may include a confidence score column and a plurality of data fields associated with the plurality of validated data records. Additionally, as illustrated in FIG. 5, an entry corresponding to a respective validated data record may include a confidence score of the record correlation inference associated with a respective validated data record and/or values of the data fields of the respective validated data across the plurality of columns of the validated records table.

Additionally, in some embodiments, the list of potentially matching system-recognized entities may be displayed in association with one or more selectable objects for selecting (or performing an action with) one of the system-recognized entities from the list. Examples of such selectable user interface objects may include, but should not be limited to, user interface buttons, checkboxes, radio buttons, dropdown menus, or any other type of interactive element that allows the user to perform an action associated with a respective entity in the list of potentially matching system-recognized entities.

In some embodiments, the one or more selectable objects displayed in association with the list of potentially matching system-recognized entities may include a first, second, third, and/or fourth selectable user interface object. Each of these selectable objects may have a distinct function when selected. For example, the first selectable user interface object, when selected, may cause S230 to map the entity in question (and future instances or occurrences of the entity in question) to the selected system-recognized entity from the list.

In some embodiments, the second selectable user interface object, when selected, may cause S230 to map the entity in question to the selected system-recognized entity from the list. However, unlike the first selectable object, the second selectable object may cause S230 to map the current instance of the entity in question, but not any future occurrences of the entity. This allows the mapping process to only be applied once and not extend to future instances of the same entity.

In some embodiments, the third selectable user interface object, when selected, may cause S230 to create a new entry in the database of the system or service. This new entry, in some embodiments, may correspond to the entity (e.g., unmapped data record) in question. In particular, this selectable object may be useful to a user when the entity in question does not match any of the system-recognized entities in the list. Thus, by creating a new entry in the database, method 200 may enable a system or service to accommodate and process this new entity, expanding its knowledge base (via active learning, as described via above) and improving its ability to handle diverse and evolving data.

In some instances, the fourth selectable user interface object, when selected, may cause S230 to block the entity in question. Blocking the entity in question, as generally referred to herein, may cause S230 to forgo mapping or processing the blocked entity in any way. This functionality may be useful to a user in situations where the entity is known to be irrelevant, erroneous, or otherwise undesirable for the purposes of the system's operations. It shall also be noted that the example user interface objects described above are not intended to be limiting and that the graphical user interface displayed by S230 may include additional, different, or fewer user interface objects than described without departing from the scope of the disclosure contemplated herein.

Furthermore, in some embodiments, the graphical user interface displayed by S230 may display entities that were unable to be automatically mapped in a table or the like. The table may include one or columns including, but not limited to, an entity name column (e.g., insurance plan name), one or more entity address column(s), entity city column, entity state column, entity zip code column, and/or the like. Each row in the table may correspond to an unmapped entity present in the patient intake data and be selectable by a user. When a selection of a row is detected, S230 may respond by displaying a list of likely potential entity matches for the unmapped entity associated with the selection (as described previously).

Automated Record Reassignment and Metadata Update Process

In some embodiments, based on identifying a record resolution candidate for an unmapped data record via the automated or assistive processes described above, S230 may automatically re-assign one or more data records of a computer database that are digitally associated with the unmapped data record to the identified resolution candidate record. For example, in some embodiments, data records previously associated with the unmapped data record may be modified from being associated with the unmapped data record to being associated with the resolution candidate record (e.g., the validated data record identified as the resolution candidate record for the unmapped data record). It shall be noted that this automatic reassignment may maintain data integrity within the computer database by ensuring that any data record related to the unmapped data record becomes properly linked to the appropriate resolution candidate Furthermore, in some embodiments, the automatic reassignment of one or more data records may include updating metadata (e.g., data fields) associated with those records. For example, metadata that previously indicated an association with the unmapped data record may be modified to reflect the new association with the resolution candidate record. Additionally, this update may also include incorporating values from the resolution candidate record into the metadata of the reassigned data records. Such values may include identifiers, attributes, or other data fields relevant to the resolution candidate record.

It shall be noted that the above-described processes and operations may be analogously performed for each validated data record (e.g., resolution candidate) identified by method 200. For example, as described above, S230 may identify a resolution candidate record for a plurality of data fields of an unmapped data record, such as a resolution candidate record for a first, second, third, etc. data field of the unmapped data record. Accordingly, the above-described processes for identifying the resolution candidate(s) may iteratively be performed for the resolution candidate record of the first data field, and subsequently proceed to perform the same processes for the resolution candidate record of the second data field, and so on for the remainder of the data fields.

Active Learning (Feedback Loop)

In some instances, S230 may include a feedback loop mechanism (e.g., active learning mechanism) to continuously learn and improve the entity resolution capabilities of method 200. The feedback loop mechanism may be triggered when S230 detects a user input selecting one of the system-recognized entities from the list of potentially matching system-recognized entities. The selection may then be used as an input to train one or more of the entity resolution models (e.g., record correlation machine learning models) implemented by S220, which may be particularly beneficial for generating more accurate or confident entity resolution inferences over time.

For example, if a user selects a system-recognized entity from the list as a match for an entity in question, S230 may use this information to update the entity resolution model. The model may then learn to associate the entity in question with the selected system-recognized entity, thereby increasing the likelihood that the model will generate a similar entity resolution inference in the future. Accordingly, this continuous learning process may be beneficial for enabling a system or service to adapt to evolving entity data and improve its overall accuracy and efficiency.

In some embodiments, the feedback loop mechanism may also be used to identify and correct errors in the entity resolution process facilitated by the method 200. For instance, if a user selects the option to block an entity in question, method 200 may use this information to update the entity resolution model to avoid generating entity resolution inferences for the blocked entity in the future. This may help reduce the occurrence of false positives and improve the overall reliability of the system.

It shall be noted that the feedback loop mechanism described herein is not limited to the specific examples provided and may be implemented in various ways without departing from the scope of the disclosure. For example, the feedback loop mechanism may be implemented using machine learning algorithms, rule-based systems, or any other suitable method for updating and improving an entity resolution model based on user feedback.

2.40 Accelerating Post-Intake Medical Activities

S240, which includes accelerating post-intake medical activities, may function to utilize the resolved patient intake data to expedite one or more various healthcare-related activities that occur after an initial intake of a patient. Example post-intake medical activities accelerated by S240 may include, but should not be limited to, patient billing processes, insurance claim submission processes, patient follow-up procedures, and/or any other relevant activities that may benefit from accurate and timely patient data.

In some embodiments, S240 may utilize the resolved patient intake data to select appropriate billing rules and codes. The selected billing rules and codes may be specific to an identified (e.g., resolved) payer and may be used to generate accurate and compliant insurance claims. For instance, in a non-limiting example, once the correct payer (e.g., insurance provider) has been identified through the entity resolution process, S240 may function to query a database of payer-specific rules and codes. The payer-specific rules and codes returned from the query may then be used to construct accurate insurance claims that are compliant with the payer's specific requirements.

Additionally, or alternatively, in some embodiments, S240 may utilize the resolved patient intake data to aid or support patient follow-up procedures. For instance, S240 may use a user profile obtained via the entity resolution process to send out appointment reminders, billing notifications, or other relevant communications to the patient.

It shall be noted that the specific post-intake medical activities accelerated by S240 may vary depending on the specific requirements of a subject medical entity (e.g., healthcare provider), the nature of the patient intake data, and/or the capabilities of the system or service implementing the method 200. Regardless of the specific activities, S240 may leverage the resolved patient intake data to improve the efficiency and effectiveness of post-intake medical activities.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
   at a record resolution service being executed by one or more computer devices:
     receiving an unmapped data record comprising a plurality of data fields;
     generating a resolution candidate record for the unmapped data record, wherein generating the resolution candidate record includes:
       computing, via a record correlator machine learning model, a plurality of record correlation inferences between the unmapped data record and each of the plurality of validated data records,
       identifying a record correlation inference of the plurality of record correlation inferences that has a confidence score greater than a pre-defined maximum confidence threshold, wherein identifying the record correlation inference that has the confidence score greater than the pre-defined maximum confidence threshold includes:
         identifying a first respective record correlation inference of the plurality of record correlation inferences, and
         using the first respective record correlation inference as the record correlation inference if a confidence score of the first respective record correlation inference is greater than confidence scores associated with a remainder of the plurality of record correlation inferences,
       querying a computer database for a validated data record of the plurality of validated data records that is associated with the record correlation inference, and
       setting the validated data record associated with the record correlation inference as the resolution candidate record for the unmapped data record; and
     automatically re-assigning one or more data records of the computer database that are digitally associated with the unmapped data record to the resolution candidate record.

2. The computer-implemented method according to claim 1, wherein:
   at least one data field of the plurality of data fields causes a mapping error between the unmapped data record and a plurality of validated data records,
   the plurality of data fields of the unmapped data record at least includes a first data field and a second data field, and
   generating the resolution candidate record includes:
     detecting if the at least one data field causing the mapping error between the unmapped data record and the plurality of validated data records includes the first data field or the second data field,
     electing the record correlator machine learning model based on the detecting, wherein electing the record correlator machine learning model includes:
       electing a first record correlator machine learning model from a record correlator machine learning model database when the at least one data field includes the first data field, and
       electing a second, different from the first, record correlator machine learning model from the record correlator machine learning model database when the at least one data field includes the second data field.

3. The computer-implemented method according to claim 1, further comprising:
   configuring a plurality of record correlator machine learning models of the record correlator machine learning model database via a graphical user interface of the record resolution service, and
   the graphical user interface of the record resolution service includes:
     a user interface table component, and
     a plurality of rows within the user interface table component that correspond to the plurality of record correlator machine learning models, wherein a row of the user interface table corresponding to a respective record correlator machine learning model of the plurality of record correlator machine learning models includes:
       text indicating a name of the respective record correlator machine learning model,
       an enable toggle button for activating or deactivating the respective record correlator machine learning model in the record resolution service,
       a plurality of user interface input fields for specifying an execution frequency of the respective record correlator machine learning model,
       a user interface input field for setting a start time to begin executing the respective record correlator machine learning model,
       a plurality of user interface input fields for specifying a span of time to avoid the executing of the respective record correlator machine learning model,
       an adjustable slider user interface component for defining a threshold range that requires a user to confirm the resolution candidate record resolves the unmapped data record when an inference associated with resolution candidate record falls within the threshold range, and
       a user interface text field that visually indicates that the record resolution service automatically resolves the unmapped data record to the resolution candidate record when the inference associated with the resolution candidate record exceeds the pre-defined maximum confidence threshold.

4. The computer-implemented method according to claim 1, wherein:
   at least one data field of the plurality of data fields causes a mapping error between the unmapped data record and a plurality of validated data records,
   the at least one data field that causes the mapping error between the unmapped data record and the plurality of validated data records includes a first respective data field and a second respective data field, the generating generates the resolution candidate record for the first respective data field of the unmapped data record and a second resolution candidate record for the second respective data field, and generating the resolution candidate record for the first respective data field and the resolution candidate record for the second respective data field includes:

computing, via the record correlator machine learning model corresponding to the first respective data field, the plurality of record correlation inferences between the unmapped data record and each of the plurality of validated data records, computing, via a second record correlator machine learning model corresponding to the second respective data field, a plurality of second record correlation inferences between the unmapped data record and each of the plurality of validated data records, identifying the record correlation inference of the plurality of record correlation inferences and a second record correlation inference of the second plurality of record correlation inferences that has the confidence score greater than the pre-defined maximum confidence threshold, querying the computer database for the validated data record of the plurality of validated data records that is associated with the record correlation inference and a second validated data record of the plurality of validated data records that is associated with the second record correlation inference, and in response to the querying:
setting the validated data record associated with the record correlation inference as the resolution candidate record for the first respective data field of the unmapped data record, and setting the second validated data record associated with the second record correlation inference as the resolution candidate record for the second respective data field of the unmapped data record.

5. The computer-implemented method according to claim 4, wherein:

the automatically re-assigning re-assigns the one or more data records of the computer database that are digitally associated with the first respective data field and the second respective data field of the unmapped data record to being digitally associated with the validated data records and the second validated data record, and the automatic re-assignment of the one or more data records includes updating metadata associated with the one or more data records to include one or more metadata values for creating a digital record association within the computer database between the one or more data records and the resolution candidate record and further includes:

updating the metadata associated with the one or more data records to include one or more metadata values associated with one or more attributes of the resolution candidate record for the first respective data field for creating the digital record association within the computer database between the one or more data records and the resolution candidate record for the first respective data field, and updating the metadata associated with the one or more data records to include one or more metadata values associated with one or more attributes of the second resolution candidate record for the second respective data field for creating the digital record association within the computer database between the one or more data records and the resolution candidate record for the second respective data field.

6. The computer-implemented method according to claim 1, wherein:

the identifying identifies the record correlation inference that (1) has the confidence score greater than the pre-defined maximum confidence threshold or (2) has the confidence score between a pre-defined minimum confidence threshold and the maximum confidence threshold, the querying queries the computer database for the validated data record that is associated with the record correlation inference that (1) has the confidence score greater than the pre-defined maximum confidence threshold or (2) has the confidence score between a pre-defined minimum confidence threshold and the maximum confidence threshold, and the generating the resolution candidate record further includes:

in accordance with a determination that the confidence score of the record correlation inference is greater than the pre-defined maximum confidence threshold:
setting the validated data record associated with the record correlation inference as the resolution candidate record for the unmapped data record, and in accordance with a determination that the confidence score of the record correlation inference is between the pre-defined minimum confidence threshold and the maximum confidence threshold:
adding the unmapped data record to a record mapping error queue that displays the unmapped data record in association with the validated data record that corresponds to the record correlation inference that is between the pre-defined minimum confidence threshold and the maximum confidence threshold.

7. The computer-implemented method according to claim 6, wherein the record mapping error queue includes:

an unmapped records table that is configured to display a plurality of unmapped data record entries corresponding to a plurality of unmapped data records, and a validated records table that is configured to display a plurality of validated data record entries that likely resolves a respective unmapped data record entry currently selected in the unmapped records table.

8. The computer-implemented method according to claim 7, wherein:

the respective unmapped data record entry currently selected in the unmapped records table corresponds to the unmapped data record, the plurality of validated data record entries that likely resolves the respective unmapped data record entry corresponds to:

the validated data record that corresponds to the record correlation inference that is between the pre-defined minimum confidence threshold and the maximum confidence threshold, and a plurality of additional validated data records that correspond to a plurality of additional record correlation inferences that were computed by the record correlator machine learning model and are between the pre-defined minimum confidence threshold and the maximum confidence threshold.

9. The computer-implemented method according to claim 8, wherein:
the record mapping error queue further includes a range slider user interface component for controlling a confidence score threshold range, and
the method further comprises:
receiving an input changing the confidence score threshold range from being between the pre-defined minimum confidence threshold and the maximum confidence threshold to being between a second pre-defined minimum confidence threshold and a second pre-defined maximum confidence threshold, and
in response to receiving the input:
identifying that the confidence score of the record correlation inference associated with the validated data record is not between the second pre-defined minimum confidence threshold and the second pre-defined maximum confidence threshold,
forgoing display, in the validated records table, a validated data record entry of the plurality of validated data record entries that corresponds to the validated data record, and
maintaining display, in the validated records table, the plurality of validated data record entries that correspond to the plurality of additional validated data records.

10. The computer-implemented method according to claim 8, wherein:
the unmapped records table includes a plurality of columns with labels identifying the plurality of data fields,
the validated records table includes a confidence score column and a plurality of columns with labels identifying data fields associated with the plurality of validated data records,
the respective unmapped data record entry corresponding to the unmapped data record includes values of the plurality of data fields of the respective unmapped data record stored across the plurality of columns of the unmapped records table, and
the validated data record entry corresponding to the validated data record includes (1) the confidence score of the record correlation inference associated with the validated data record and (2) values of the data fields of the validated data record across the plurality of columns of the validated records table.

11. The computer-implemented method according to claim 8, wherein the record mapping error queue includes:
a first selectable button that, when selected, causes the respective unmapped data record entry to resolve the unmapped data record to the validated data record and the record resolution service to resolve future instances of the unmapped data record to the validated data record,
a second selectable button that, when selected, causes the respective unmapped data record entry to resolve the unmapped data record to the validated data record and without resolving the future instances of the unmapped data record to the validated data record,
a third selectable button that, when selected, causes the respective unmapped data record entry to be added to the computer database, and
a fourth selectable button that, when selected, blocks the record resolution service from resolving the unmapped data record and the future instances of the unmapped data record to the validated data record.

12. A computer-implemented method comprising:
at a remote record resolution service being executed by one or more computer servers:
receiving an unmapped data record comprising a plurality of data fields, wherein at least one data field of the plurality of data fields causes a mapping error between the unmapped data record and a plurality of validated data records;
generating, from the plurality of validated records, a resolution candidate record for the unmapped data record based on detecting the mapping error between the unmapped data record and the plurality of validated data records, wherein generating the resolution candidate record includes:
computing, via a record correlator machine learning model, a plurality of record correlation inferences between the unmapped data record and each of the plurality of validated data records,
identifying a record correlation inference of the plurality of record correlation inferences outputted by the record correlator machine learning model that has a confidence score greater than a pre-defined maximum confidence threshold,
querying a computer database for a validated data record of the plurality of validated data records that is associated with the record correlation inference that has the confidence score greater than the pre-defined maximum confidence threshold, and
in response to the querying, setting the validated data record associated with the record correlation inference as the resolution candidate record for the unmapped data record; and
automatically re-assigning one or more data records of the computer database that are digitally associated with the unmapped data record to the resolution candidate record based on the setting of the validated data record, wherein the automatic reassignment of the one or more data records includes updating metadata associated with the one or more data records to include one or more metadata values for creating a digital record association within the computer database between the one or more data records and the resolution candidate record.

* * * * *